(12) United States Patent
Setomoto et al.

(10) Patent No.: US 8,847,504 B2
(45) Date of Patent: Sep. 30, 2014

(54) LIGHTING DEVICE AND LIGHTING SYSTEM

(75) Inventors: Tatsumi Setomoto, Osaka (JP); Hideo Nagai, Osaka (JP); Takaari Uemoto, Osaka (JP)

(73) Assignee: Panasonic Corporation, Osaka (JP)

( * ) Notice: Subject to any disclaimer, the term of this patent is extended or adjusted under 35 U.S.C. 154(b) by 231 days.

(21) Appl. No.: 13/265,826

(22) PCT Filed: May 21, 2010

(86) PCT No.: PCT/JP2010/003422
§ 371 (c)(1),
(2), (4) Date: Oct. 21, 2011

(87) PCT Pub. No.: WO2010/143362
PCT Pub. Date: Dec. 16, 2010

(65) Prior Publication Data
US 2012/0038284 A1    Feb. 16, 2012

(30) Foreign Application Priority Data

Jun. 11, 2009    (JP) ................................ 2009-140092

(51) Int. Cl.
*H05B 37/02*    (2006.01)
*H05B 33/08*    (2006.01)

(52) U.S. Cl.
CPC ............. *H05B 33/0827* (2013.01); *Y02B 20/19* (2013.01); *Y02B 20/383* (2013.01); *H05B 33/0872* (2013.01)
USPC ..................................... 315/209 R; 315/210

(58) Field of Classification Search
CPC ........... H05B 33/0827; H05B 33/0872; Y02B 20/19; Y02B 20/383
USPC ..................................................... 315/209 R
See application file for complete search history.

(56) References Cited

U.S. PATENT DOCUMENTS 7,150,814 B1 * 12/2006 Parce et al. ................... 204/600
2006/0082333 A1    4/2006 Laski
(Continued)

FOREIGN PATENT DOCUMENTS

DE    102004047766    4/2006
DE    102007044556    3/2009
(Continued)

OTHER PUBLICATIONS

Lager, Aaron; "Line-Powered Driver Lights Up High-Power LEDs"; Jun. 8, 2006, EDN Japan, http://www.ednjapan.com/content/issue/2006/09/idea/idea01.html; 8 pages with English translation.

(Continued)

*Primary Examiner* — Douglas W Owens
*Assistant Examiner* — Monica C King

(57) ABSTRACT

Provided is a lighting device which can be dimmed and subjected to change in color temperature of the lighting color in accordance with a dimming level. To the lighting device, AC power under phase-controlled is supplied. The lighting device is provided with a light emitting elements array and a switching unit. The light emitting elements array includes a plurality of light emitting elements, which are two or more types of light emitting elements having different lighting colors. The switching unit switches an electrical connections between the light emitting elements included in the light emitting elements array so as to change the number of light emitting elements inserted in series to a power supply path and the proportion of numbers of light emitting elements per lighting color among the number of the inserted light emitting elements in accordance with a voltage supplied to the light emitting elements array.

13 Claims, 18 Drawing Sheets

(56) References Cited

U.S. PATENT DOCUMENTS

| | | |
|---|---|---|
| 2007/0040512 A1 | 2/2007 | Jungwirth et al. |
| 2009/0184669 A1* | 7/2009 | Tsai .............................. 315/297 |
| 2010/0201283 A1* | 8/2010 | Kawata et al. ................ 315/287 |
| 2010/0301777 A1 | 12/2010 | Kraemer |

FOREIGN PATENT DOCUMENTS

| | | |
|---|---|---|
| JP | 2006-147933 | 6/2006 |
| JP | 2006147933 A * | 6/2006 |
| JP | 2006-236709 | 9/2006 |
| JP | 2008-544569 | 12/2008 |
| WO | 2004/100612 | 11/2004 |
| WO | 2007/001116 | 1/2007 |
| WO | 2008/071206 | 6/2008 |

OTHER PUBLICATIONS

European Patent Application No. 10785894.6 Extended Search Report dated Dec. 11, 2012, 4 pages.

* cited by examiner

FIG. 3

| Voltage[V] | FET | Combination Color[K] |
|---|---|---|
| 0-21 | 1 | 2800 |
| 22-42 | 2 | 2800 |
| 43-63 | 3 | 3000 |
| 64-84 | 4 | 3150 |
| 85-105 | 5 | 3520 |
| 106-126 | 6 | 3770 |
| 127-147 | 7 | 4190 |
| 148-168 | 8 | 4500 |

FIG. 5

| Voltage[V] | FET | Combination Color[K] |
|---|---|---|
| 0-30 | 1 | 2800 |
| 31-59 | 2 | 2800 |
| 60-86 | 3 | 3020 |
| 87-110 | 4 | 3240 |
| 111-129 | 5 | 3520 |
| 130-143 | 6 | 3660 |
| 144-152 | 7 | 3860 |
| 153-155 | 8 | 3920 |

FIG. 7A
Japan:100V

| Phase Angle[°] | Voltage[V] | Number of LEDs |
|---|---|---|
| 0-11 | 0-30 | 9 |
| 12-22 | 31-59 | 17 |
| 23-33 | 60-86 | 25 |
| 34-44 | 87-110 | 32 |
| 45-56 | 111-129 | 38 |
| 57-67 | 130-143 | 42 |
| 68-77 | 144-152 | 45 |
| 78-90 | 153-155 | 46 |

FIG. 7B
Europe and other countries:230V

| Phase Angle[°] | Voltage[V] | Number of LEDs |
|---|---|---|
| 0-11 | 0-70 | 21 |
| 12-22 | 71-137 | 40 |
| 23-33 | 138-199 | 58 |
| 34-44 | 200-253 | 74 |
| 45-56 | 254-298 | 87 |
| 57-67 | 299-331 | 97 |
| 68-77 | 332-351 | 103 |
| 78-90 | 352-358 | 105 |

FIG. 7C
United States, Canada and Mexico:120V

| Phase Angle[°] | Voltage[V] | Number of LEDs |
|---|---|---|
| 0-11 | 0-36 | 11 |
| 12-22 | 37-71 | 21 |
| 23-33 | 72-104 | 31 |
| 34-44 | 105-132 | 39 |
| 45-56 | 133-155 | 46 |
| 57-67 | 156-172 | 51 |
| 68-77 | 173-183 | 54 |
| 78-90 | 184-187 | 55 |

FIG. 7D
China, Taiwan and Korea:110V

| Phase Angle[°] | Voltage[V] | Number of LEDs |
|---|---|---|
| 0-11 | 0-33 | 10 |
| 12-22 | 34-65 | 19 |
| 23-33 | 66-95 | 28 |
| 34-44 | 96-121 | 36 |
| 45-56 | 122-142 | 42 |
| 57-67 | 143-158 | 46 |
| 68-77 | 159-168 | 49 |
| 78-90 | 169-171 | 50 |

FIG. 10

| Phase[deg] | FET | Combination Color[K] |
|---|---|---|
| 0—11 | 1 | 2800 |
| 12—22 | 2 | 2800 |
| 23—33 | 3 | 3020 |
| 34—44 | 4 | 3240 |
| 45—56 | 5 | 3520 |
| 57—67 | 6 | 3660 |
| 68—77 | 7 | 3860 |
| 78—90 | 8 | 3920 |
| 91—103 | 8 | 3920 |
| 104—113 | 7 | 3860 |
| 114—124 | 6 | 3660 |
| 125—136 | 5 | 3520 |
| 137—147 | 4 | 3240 |
| 148—158 | 3 | 3020 |
| 159—169 | 2 | 2800 |
| 170—180 | 1 | 2800 |

# LIGHTING DEVICE AND LIGHTING SYSTEM

TECHNICAL FIELD

The present invention relates to a lighting device and a lighting system which are provided with a light-emitting element such as an LED (Light-emitting Diode).

BACKGROUND ART

In recent years, a light-emitting element such as an LED has come to be used for general lighting in consideration of the global environment. For example, the non-patent literature 1 below discloses a lighting device in which AC voltage supplied from a commercial power source is converted into DC voltage using a rectifying/smoothing circuit, the DC voltage is applied to an LED array, and the LED array lights up under constant current control. In addition, the patent literature 1 below discloses a lighting device employing a lighting system using an AC current in which AC voltage supplied from a commercial power source is applied to an LED array without conversion.

CITATION LIST

Patent Literature

[Patent Literature 1]
Japanese Patent Application Publication No. 2008-544569

Non-Patent Literature

[Non-Patent Literature 1]
http://www.ednjapan.com/content/issue/2006/09/idea/idea01.html

SUMMARY OF INVENTION

Technical Problem

Conventionally, a phase control device using a TRIAC, etc. is widespread as a dimming device for an incandescent lamp. A phase control device has a simple circuit configuration and thus is applicable not only to an incandescent lamp but also to an LED lighting device. In addition, an incandescent lamp generates a peculiar atmosphere, since the color temperature of the lighting color decreases (i.e., the lighting color becomes redder) in accordance with the decrease in luminance as a result of dimming. In certain applications, it is envisaged that an LED lighting device may also have the color temperature of the lighting color changed in accordance with the change in luminance as a result of dimming.

However, in the lighting device according to the non-patent literature 1, dimming is performed by changing the current value setting under constant current control. Thus, dimming using a phase control device has not been considered. On the other hand, the lighting device according to the patent literature 1 may be provided with a phase control device, but is not able to have the color temperature of the lighting color changed in accordance with a dimming level.

Thus, an object of the present invention is to provide a lighting device having a light-emitting element such as an LED and capable of being dimmed, allowing the color temperature of the lighting color to be changed in accordance with a dimming level.

Solution to Problem

In order to achieve the object described above, the present invention provides a lighting device to which phase controlled AC electric power is supplied, the lighting device comprising a light-emitting array including a plurality of light-emitting elements that light up when inserted in series into a power supply path, and are grouped into two or more sets, each set having one of different lighting colors; and a switching unit configured to switch electrical connections of the sets in accordance with a voltage level of the phase controlled AC electric power so as to change (i) the number of the light-emitting elements inserted in series into the power supply path and to change (ii) a numerical proportion of the light-emitting elements per lighting color among the inserted light-emitting elements.

Advantageous Effects of Invention

According to the above structure of the present invention, among the plurality of light emitting elements included in the light emitting array, the ones inserted in series into the power supply path light up. Dimming is achieved by changing, in accordance with the voltage supplied to the light emitting array, the number of the light emitting elements which light up. In addition, the color temperature of the lighting color can be changed in accordance with the dimming level by changing the proportion of the numbers of the light emitting elements per color among the number of the light emitting elements lighting up.

BRIEF DESCRIPTION OF DRAWINGS

FIG. 3 is a table showing the voltage supplied to the LED array, numeral indicating the switch element which is turned on, and the combination color of light emitted by the LED array.

FIG. 5 is a table showing the voltage supplied to the LED array, numeral indicating the switch element which is turned on, and the combination color of light emitted by the LED array.

FIG. 7A to 7D are tables each showing the phase angle of the AC voltage, voltage supplied to the LED array, and number of the LEDs inserted in series into the power supply path.

FIG. 10 is a table showing the voltage phase of the AC power source, numeral indicating the switch element which is turned on, and the combination color of light emitted by the LED array.

DESCRIPTION OF EMBODIMENTS

Embodiments of the present invention are described below in detail with reference to the drawings.

First Embodiment

Figure 1:
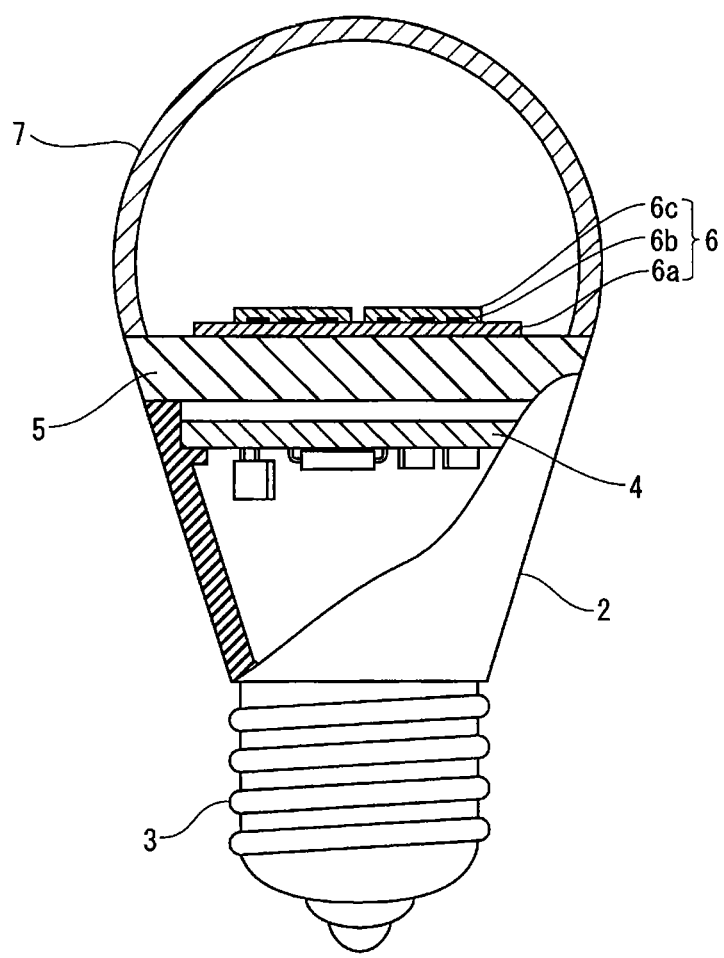
FIG. 1 is a partially cut-away view showing schematically a structure of a bulb-shaped lighting device according to a first embodiment of the present invention.

FIG. 1 is a partially cut-away view showing schematically the structure of a bulb-shaped lighting device according to a first embodiment of the present invention.

A lighting device 1 has an apparent shape modeled on an incandescent lamp. A cylindrical case 2 is made of an insulating material such as a resin. The case 2 has an E-type base 3 provided at one end thereof, and a disk-shaped heat sink 5 at the other end. In the internal space of the case 2 which is closed off by the base 3 and the heat sink 5, a circuit module 4 is housed. A light-emitting module 6 is mounted on one side of the heat sink 5 opposite to the surface thereof closing off the case, and a globe 7 is attached for encapsulating the light-emitting module 6.

The light-emitting module 6 includes a substrate 6a having a wiring pattern disposed on a surface thereof, LED chips 6b mounted on the wiring pattern, and molded resin parts 6c encapsulating the LED chips 6b. The molded resin part 6c contains a material converting the wavelengths of the light emitted by the LED chip 6b (for example, a fluorescent material), and thus serves as a wavelength conversion part. A portion of the light emitted by the LED chip 6b is subject to wavelength conversion while passing through the molded resin part 6c, and subsequently is combined in color with the remainder of the light emitted without wavelength conversion, so that light having a desired color temperature is generated. In the case where the desired color temperature is achieved by the combination of the LED chips and the molded resin parts each containing a wavelength conversion material, the LED chips encapsulated by the molded resin parts correspond to the "light emitting elements". On the other hand, in the case where the desired color temperature is achieved by LED chips only, the LED chips correspond to the "light emitting elements".

In the light-emitting module 6 of the present embodiment, 4 types of LEDs are mounted, each emitting light having a different color temperature of 2800 K, 3500 K, 5000 K or 6700 K.

When the base 3 is attached to a lighting fixture, electric power is supplied from a commercial AC power source. The supplied electric power is transmitted through the circuit module 4 to the light-emitting module 6. Hereinafter, descriptions are made for the circuit module 4 and a lighting circuit provided on the light-emitting module 6.

Figure 2:
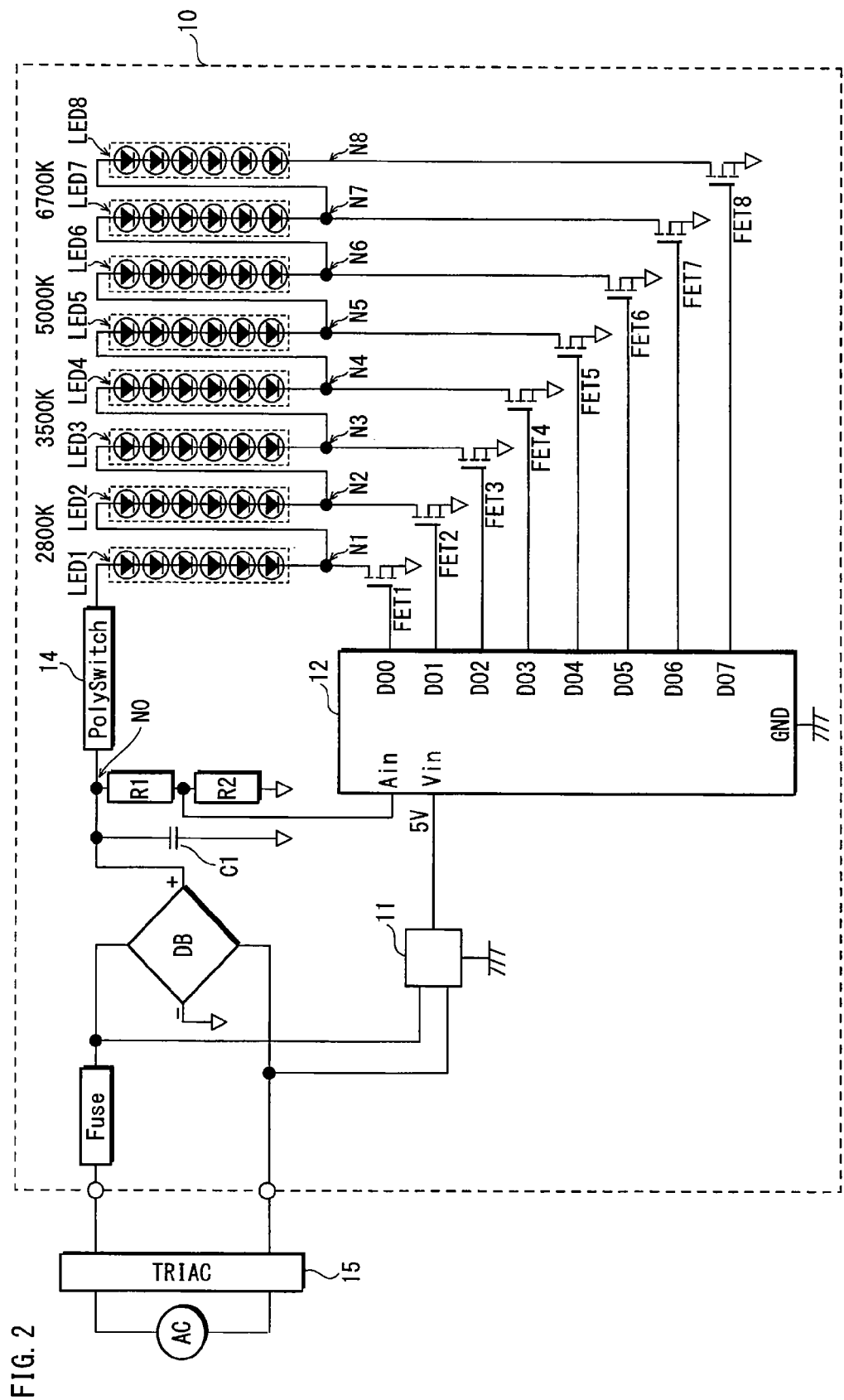
FIG. 2 is a circuit diagram showing the configuration of a lighting circuit according to the first embodiment of the present invention.

FIG. 2 is a circuit diagram showing the configuration of a lighting circuit according to the first embodiment of the present invention.

In a lighting circuit 10, a rectifying/smoothing circuit is constructed by a diode bridge DB and an electrolytic capacitor C1. The rectifying/smoothing circuit is connected to an AC power source AC via a current fuse and a TRIAC 15. In addition, on the secondary side of the rectifying/smoothing circuit, an LED array is connected, which includes 48 LEDs in total grouped into 8 sets (i.e., LED set 1 to LED set 8). The LED sets are configured to have different lighting colors. In the present embodiment, as shown below, color temperatures are set to increase from the LED set 1 to the LED set 8 in order.

LED set 1: 2800 K
LED set 2: 2800 K
LED set 3: 3500 K
LED set 4: 3500 K
LED set 5: 5000 K
LED set 6: 5000 K
LED set 7: 6700 K
LED set 8: 6700 K A node N0 of the LED array is connected to the positive terminal of the diode bridge DB. A node N1 at the end of the LED set 1 is connected to the negative terminal of the diode bridge DB via a switch element FET1. A node N2 at the end of the LED set 2 is connected to the negative terminal of the diode bridge DB via a switch element FET2. Similarly, nodes N3 to N8 are connected to the negative terminal of the diode bridge DB via switch elements FET3 to FET8, respectively.

A micro computer 12 serves to control the on/off of the switch elements FET1 to FET8 in accordance with the voltage supplied to the LED array. As a particular example of the micro computer 12, PIC18F252 provided by Microchip Technology Inc. may be mentioned. A DC power source unit 11 is connected to a power source terminal Vin of the micro computer 12. The DC power source unit 11 generates a DC voltage of 5V for the operations of the micro computer 12. A voltage divider constituted by resistive elements R1 and R2 is connected to an analog input terminal Ain. Thus, the micro computer 12 can detect the DC voltage supplied to the LED array. Gate terminals of the switch elements FET 1 to FET8 are connected to digital output terminals DO0 to DO7, respectively. The switch elements and the micro computer 12 together serve as a switching means for changing the connections of the 48 LEDs included in the LED array.

Between the LED array and the positive terminal of the diode bridge DB, a PolySwitch 14 is connected, which is an overcurrent protection element for preventing excessive current from flowing to the LED array. The PolySwitch 14 is a kind of PTC thermistor, and LVR005S manufactured by Tyco Electronics Raychem K.K. may be used, for example. In particular, the number of the LEDs connected in series may be too small relative to the instantaneous voltage value of the AC power source as a result of delayed or unstable operations of the micro computer 12. In such a case, the PolySwitch 14 would prevent excessive current from flowing to the LEDs. Incidentally, the overcurrent protection element is not limited to the PTC thermistor. A current fuse etc. may be used, as long as it has a function as an overcurrent protection element. However, the PTC thermistor is more convenient to use than a current fuse, since the former can be restored as a result of temperature decrease while the latter has to be replaced every time a blowout occurs.

According to the structure above, by turning on/off the switch elements FET1 to FET8, changes can be made to the number of the LEDs connected in series in the power supply path starting from the AC power source AC. For example, when the FET1 is turned on and the FET2 to FET8 are turned off, 6 LEDs included in the LED set 1 are inserted in series into the power supply path and light up. When the FET2 is turned on and the FET1 and FET3 to FET 8 are turned off, 12 LEDs included in the LED sets 1 and 2 are inserted in series into the power supply path and light up.

The change of the number of the LEDs inserted in series results in the change of the proportion of the numbers of LEDs per lighting color among the number of the LEDs inserted in series. When the LED sets 1 and 2 light up, the number of the LEDs lighting up is 12 in total, and the 12 LEDs together exhibit a color temperature of 2800 K. Thus, the color temperature of the light emitted by the LED array is calculated as below, and the result is 2800 K.

$$2800\ K \times 12(LEDs)/12(LEDs) = 2800\ K$$

The LED sets 1 to 3 light up, the number of the LEDs lighting up is 18 in total, which are divided into 12 LEDs exhibiting a color temperature of 2800 K and 6 LEDs exhibiting a color temperature of 3500 K. Thus, the color temperature of the lighting color of the LED array is calculated as below, and the result is 3000 K, which is the average of the color temperatures exhibited by the LEDs lighting up.

$$(2800\ K \times 12(LEDs) + 3500\ K \times 6(LEDs))/18(LEDs) =$$
$$3033\ K \approx 3000\ K$$

In this way, the color temperature of the light emitted by the LED array can be changed.

FIG. 3 is a table showing the range of voltage supplied to the LED array, numeral indicating the switch element turned on, and the combination color of light emitted by the LED array.

When an AC voltage of 110V is supplied from the AC power source, the voltage supplied to the LED array varies within a range of approximately 15V to 155V in accordance with the dimming level. At the maximum dimming level (rated lighting), a voltage of 155V is supplied to the LED array. In this case, the micro computer 12 turns on the switch element FET8 so that the LED sets 1 to 8 light up. Consequently, the lighting color of the LED array has a color temperature of 4500 K. As the dimming level of the TRIAC 15 decreases, the LED sets cease to light up from the LED set 8 to the LED set 1 in a descending order. As a result, the color temperature of the lighting color of the LED array decreases as the luminance of the LED array decreases. Accordingly, an LED lighting device is provided which achieves characteristics similar to those of an incandescent lamp lighting up under dimming control.

Second Embodiment

Figure 4:
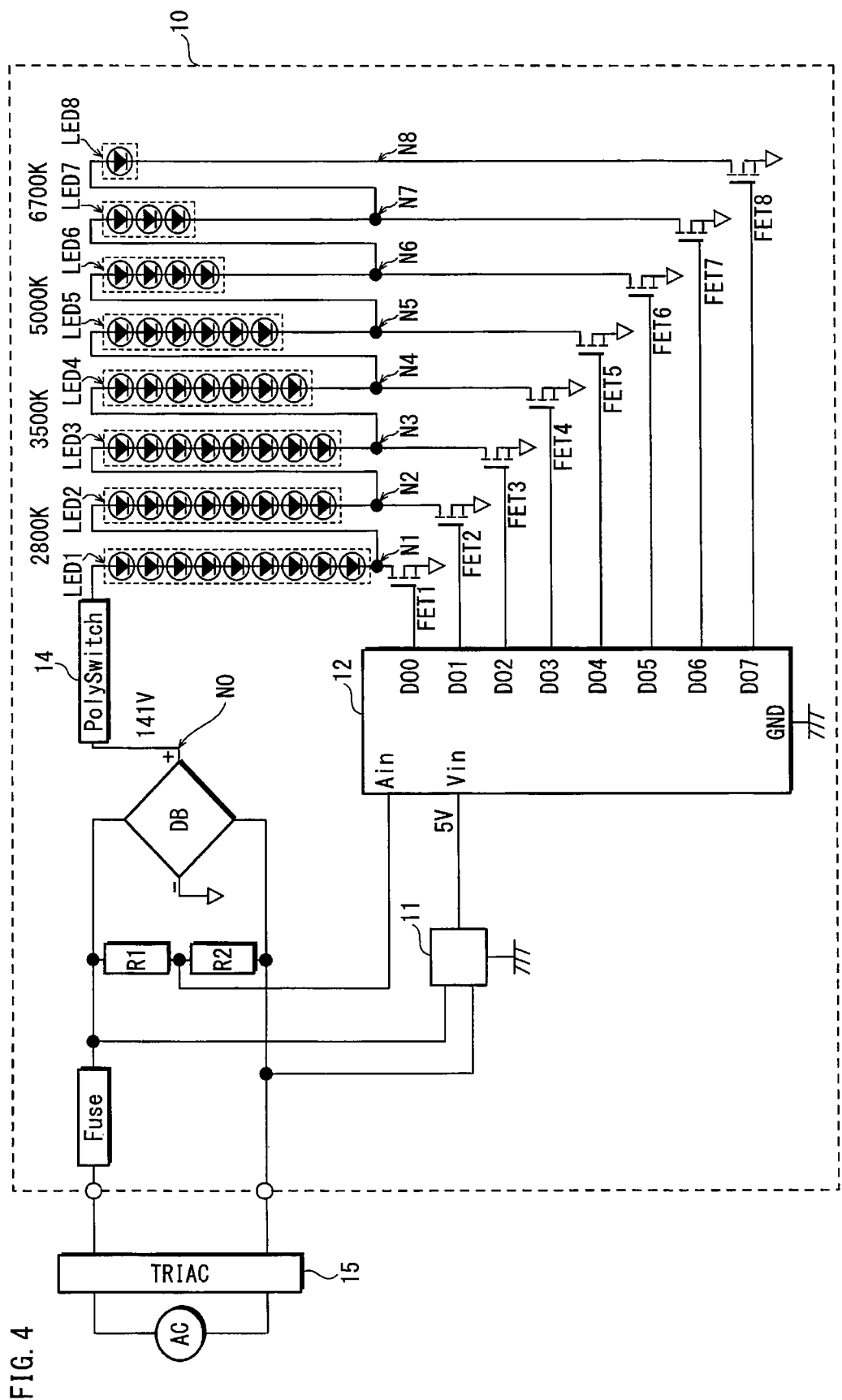
FIG. 4 is a circuit diagram showing the configuration of a lighting circuit according to the second embodiment of the present invention.

FIG. 4 is a circuit diagram showing the configuration of the lighting circuit according to the second embodiment of the present invention The LED array according to the second embodiment lights up using AC electric power, while the LED array according to the first embodiment lights up using DC electric power. Therefore, in the second embodiment, a rectification circuit is provided instead of the rectifying/smoothing circuit. Also, the configuration of the LED array is modified so as to be suitable for lighting up using AC electric power. Otherwise, the structure of the second embodiment is similar to that of the first embodiment.

The LED array includes 46 LEDs in total connected in series, which are grouped into 8 sets (i.e., LED sets 1 to 8). The number of LEDs included in each LED set and the color temperature thereof are shown below.

LED set 1: 9 LEDs, 2800 K
LED set 2: 8 LEDs, 2800 K
LED set 3: 8 LEDs, 3500 K
LED set 4: 7 LEDs, 3500 K
LED set 5: 6 LEDs, 5000 K
LED set 6: 4 LEDs, 5000 K
LED set 7: 3 LEDs, 6700 K
LED set 8: 1 LED, 6700 K The total number (N) of the LEDs has been determined according to the relational expression shown below.

$$N = Veff \times 1.1 \times \sqrt{2}/Vf$$

wherein Veff (V) indicates the reference voltage (effective value) of the AC power source, and Vf (V) indicates the voltage induced when a rated current flows.

The rated current indicates a current value which enables the luminous efficacy of the LEDs to be maintained at an optimum level or a current value which is suitable for the lighting conditions and thermal designs under the operating environment expected when designing a lighting fixture.

Here, given that Veff is 100V and Vf is 3.4V, N is calculated to be 46 (LEDs). The voltage obtained by Veff×1.1×√2 is equal to a value obtained by multiplying the peak voltage of the AC power source by 1.1. The voltage of the commercial AC power source has a tolerance of about ±10%. By multiplying by 1.1, consideration is made so that, even if the voltage of the AC power source increases by 10% within the range of the tolerance, excessive current is prevented from flowing to the LEDs.

FIG. 5 is a table showing the voltage supplied to the LED array, numeral indicating the switch element which is turned on, and the combination color of light emitted by the LED array.

The micro computer 12 detects the voltage (instantaneous value) supplied to the LED array and subsequently turns on a specific one of the switch elements FETs corresponding to the detected voltage. Thus, the number of the LEDs inserted in series into the power supply path can be changed. In accordance with the change of the number of the inserted LEDs, the proportion of the numbers of the LEDs per color among the number of the inserted LEDs also changes, which results in the change of the color temperature of light emitted by the LED array. Incidentally, in the present embodiment, since the number of the LED(s) included in each of the LED sets 1 to 8 is different from that in the first embodiment, the lighting color of the LED array corresponding to the turned-on switch element is different from that in the first embodiment.

Figure 6:
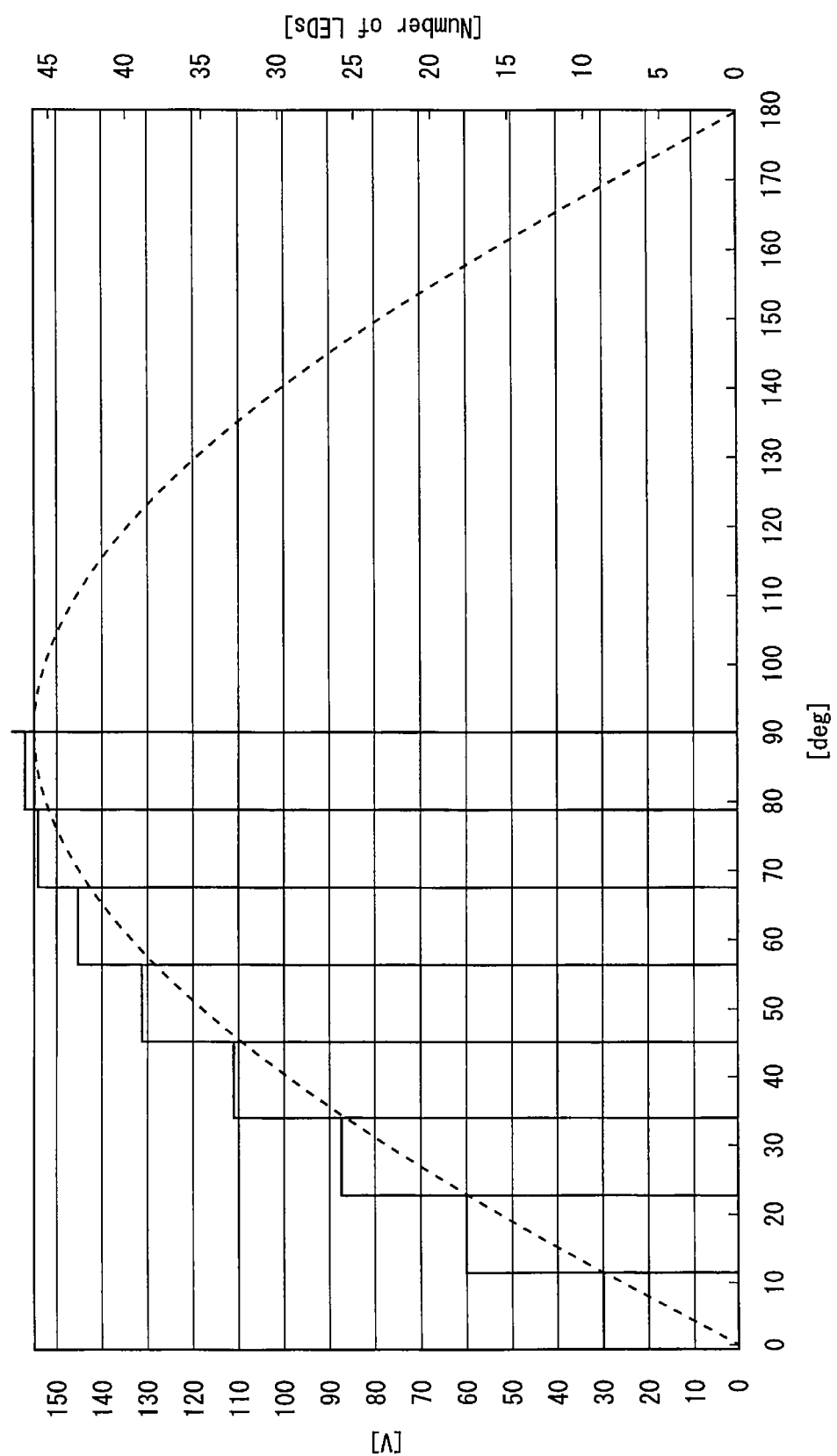
FIG. 6 is a view showing the change of the number of LEDs which are inserted in series into the power supply path under the on/off control of FETs in accordance with the table in FIG. 5.

FIG. 6 is a view showing the change of the number of LEDs which are inserted in series into the power supply path under the on/off control of FETs in accordance with the table in FIG. 5. Here shown is the range of 0 to 90 degrees, which corresponds to a first half of a half-cycle of the AC power source. The dashed line in the figure indicates the voltage of the AC power source having a peak voltage of 155V.

When the voltage is in the range of 0 to 30V, the FET 1 is turned on and the FETs 2 to 8 are turned off. In this case, the 9 LEDs included in the LED set 1 are inserted in series into the power supply path.

When the voltage is in the range of 31 to 59V, the FET 2 is turned on and the FETs 3 to 8 are turned off. In this case, the 17 LEDs included in the LED sets 1 and 2 are inserted in series into the power supply path.

Similarly, as the voltage increases, the number of the LEDs inserted in series also increases. When the voltage is in the range of 153 to 155V, all the 46 LEDs included in the LED sets 1 to 8 are inserted in series into the power supply path.

As the table shows clearly, in the range of 91 to 180 degrees which corresponds to the last half of the half-cycle of the AC power source, the number of the LEDs inserted in series into the power supply path decreases as the voltage decreases.

Incidentally, as shown in FIG. 6, the number of LEDs for each range is set to a value obtained by dividing the AC voltage (instantaneous value) of the range by Vf (V). For example, in the case where the voltage (instantaneous value) is within the range of 0 to 30V, the number of LEDs set for this range is 9, which is obtained by dividing the voltage (instantaneous value) (30V) by the rated voltage (3.4V) of the LEDs. Accordingly, in each range, an adequate number of LEDs are connected in series in accordance with the instantaneous value of the voltage of the AC power source. Incidentally, each range is defined by dividing the half-cycle (corresponding to the phase angle of 0 to 90 degrees) of the AC voltage nearly equally by 8.

FIG. 7 shows tables each showing the phase angle of the AC voltage, voltage supplied to the LED array, and number of the LEDs inserted in series into the power supply path. In Japan, as shown in FIG. 7A, the reference voltage of the AC power source is 100V and, thus, the peak of the AC voltage (instantaneous value) is estimated as 155V, taking the tolerance of ±10% into consideration. For the section corresponding to the phase angle of 0 to 11 degrees, the number of the LEDs inserted in series is determined to be 9 by dividing the instantaneous voltage value for the phase angle of 11 degrees (i.e., 30V) by the rated voltage (Vf) of the LEDs (i.e., 3.4V). For other sections, the numbers of the inserted LEDs are calculated in the same manner.

FIG. 7B is a table showing the cases of European and other countries, where the reference voltage of the power source is 230V. FIG. 7C is a table showing the cases of the United States and other countries, where the reference voltage of the power source is 120V. FIG. 7D is a table showing the cases of China and other countries, where the reference voltage of the power source is 110V. These tables have been created in the same manner as the table of FIG. 7A.

FIG. 8 shows the sequential change of the number of the LEDs inserted in series into the power supply path for three different dimming levels. In addition to the sequential change of the number of the LEDs, the TRIAC gate signals and the voltage supplied to the lighting device are also shown.

Figure 8A:
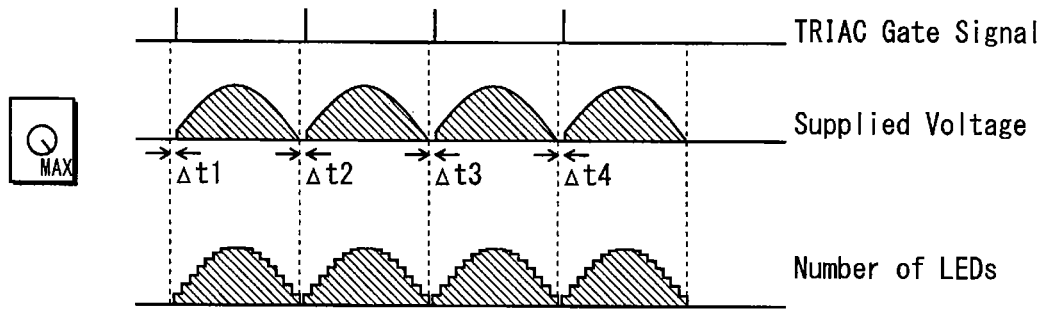
FIG. 8 shows the sequential change of the number of the LEDs inserted in series into the power supply path for three different dimming levels.

FIG. 8A shows the case of the maximum dimming level. With the use of the TRIAC 15, even in the case where the dimming level is set at maximum, a slight delay occurs between the zero cross and the rise of the supplied voltage. In the period from the zero cross to the rise of the voltage, the number of the LEDs connected in series is zero. In the period from the rise of the voltage to the next zero cross, the number of the LEDs connected in series changes in accordance with the detected voltage.

Figure 8B:
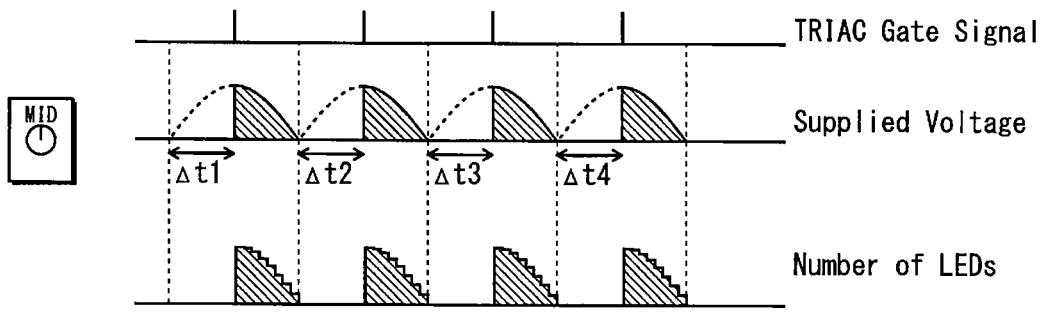

FIG. 8B shows the case of the medium dimming level. In this case, until the phase reaches 90 degrees, the voltage does not rise, and, accordingly, the number of the LEDs connected in series is zero. The voltage rises when the phase is 90 degrees, and subsequently, the number of the LEDs connected in series changes in accordance with the detected voltage.

Figure 8C:
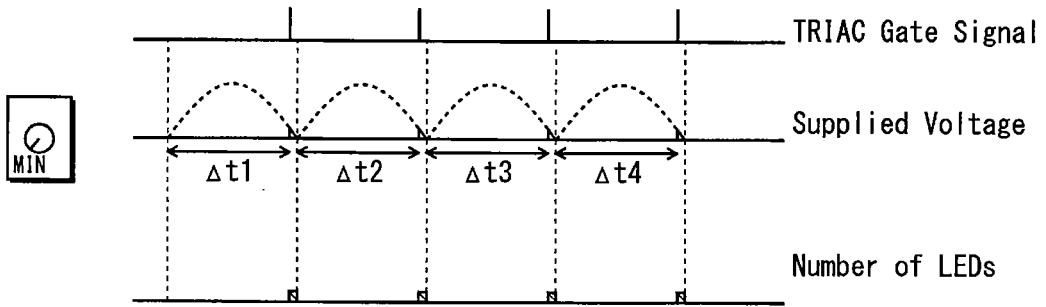

FIG. 8C shows the case of the minimum dimming level. With the use of the TRIAC 15, in the case where the dimming level is set at minimum, the voltage rises nearly at the end of a half-cycle and the electric power is supplied for only a short period. Since nearly 15V of DC voltage can be obtained from the above electric power, the micro computer can operate even when the dimming level is set at the minimum.

In this way, according to the present embodiment, the length of the lighting period of the LED array can be changed in accordance with the dimming level. Consequently, dimming of lighting under the phase control is possible. Incidentally, when the dimming of lighting is performed, the LEDs are to blink every half-cycle of the AC voltage. However, such blinking cannot be detected by human eyes, and the light emitted by the LEDs has seemingly constant luminance. Similarly, in the present embodiment, color temperature of the LED array sequentially changes during a half-cycle of the AC voltage. However, the color temperature human eyes can detect is an averaged one. Incidentally, sensuous difference of color is called color difference (ΔE), which is defined by the luminance (L) and uv chromaticity coordinates of the tristimulus values of colors in the CIE uniform color space as shown below.

$$\Delta E(CIELUV) = ((\Delta L)^2 + (\Delta u)^2 + (\Delta v)^2)^{1/2}$$

Since the LEDs in the present embodiment light up using an AC current (strictly speaking, a full-wave rectified pulsating current), no electrolytic capacitor for smoothing is required. Consequently, the size of the case of the bulb-shaped lighting device can be reduced, which results in the reduction of the size of the lighting device. In addition, since an electrolytic capacitor is a primary factor having a decisive influence on the length of the service life of a power source circuit, the omission of the electrolytic capacitor enables the service life of a power source circuit to be increased in a stable manner.

Third Embodiment

In the third embodiment, the elapsed time from the zero cross of the AC voltage is treated as the information indicating the voltage supplied to the LED array. While the circuit configuration of the lighting circuit is the same as that in the second embodiment, the operations of the micro computer 12 are different from those in the second embodiment.

Figure 9:
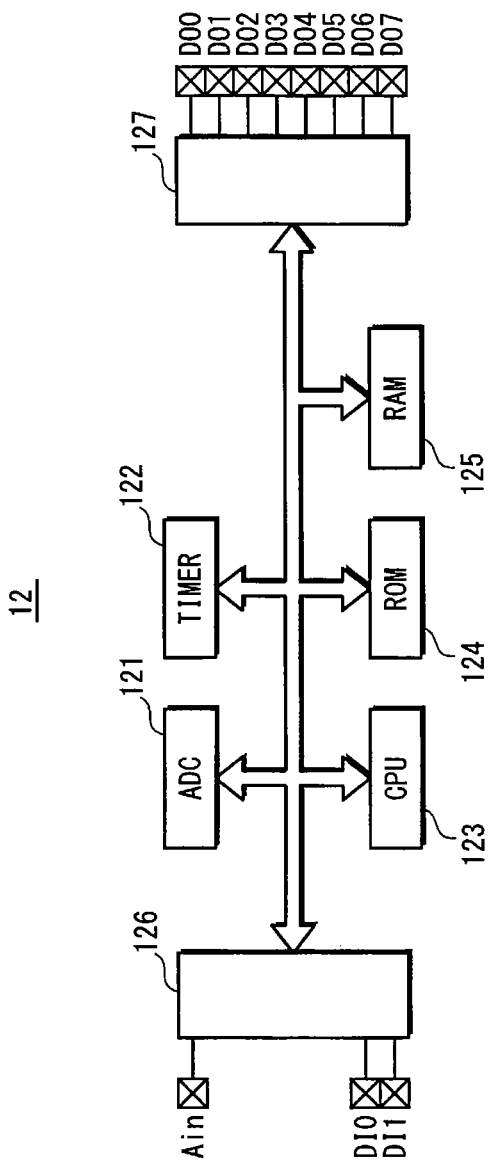
FIG. 9 is a view showing the internal structure of the micro computer 12.

FIG. 9 is a view showing the internal structure of the micro computer 12. The micro computer 12 includes an AD converter 121, timer 122, CPU 123, ROM 124, RAM 125, input port 126 and output port 127. The input port 126 is provided with an analog input terminal Ain and digital input terminals DI0, DI1. The output port 127 is provided with digital output terminals DO0 to DO7. The CPU 123 operates in accordance with the programs and data stored in the ROM 124 and the RAM 125.

FIG. 10 is a table showing the voltage phase of the AC power source, numeral indicating the switch element which is turned on, and combination color of light emitted by the LED array. The voltage phase of the AC power source corresponds to the elapsed time from the zero cross. The numeral indicating the switch element which is turned on corresponds to the number of the LEDs inserted in series.

The column indicating the voltage phase covers the range of 0 to 180 degrees corresponding to a half-cycle of the AC power source, which is divided into 16 sections. The FET column shows the numeral indicating the FET which is turned on in each section.

Figure 11:
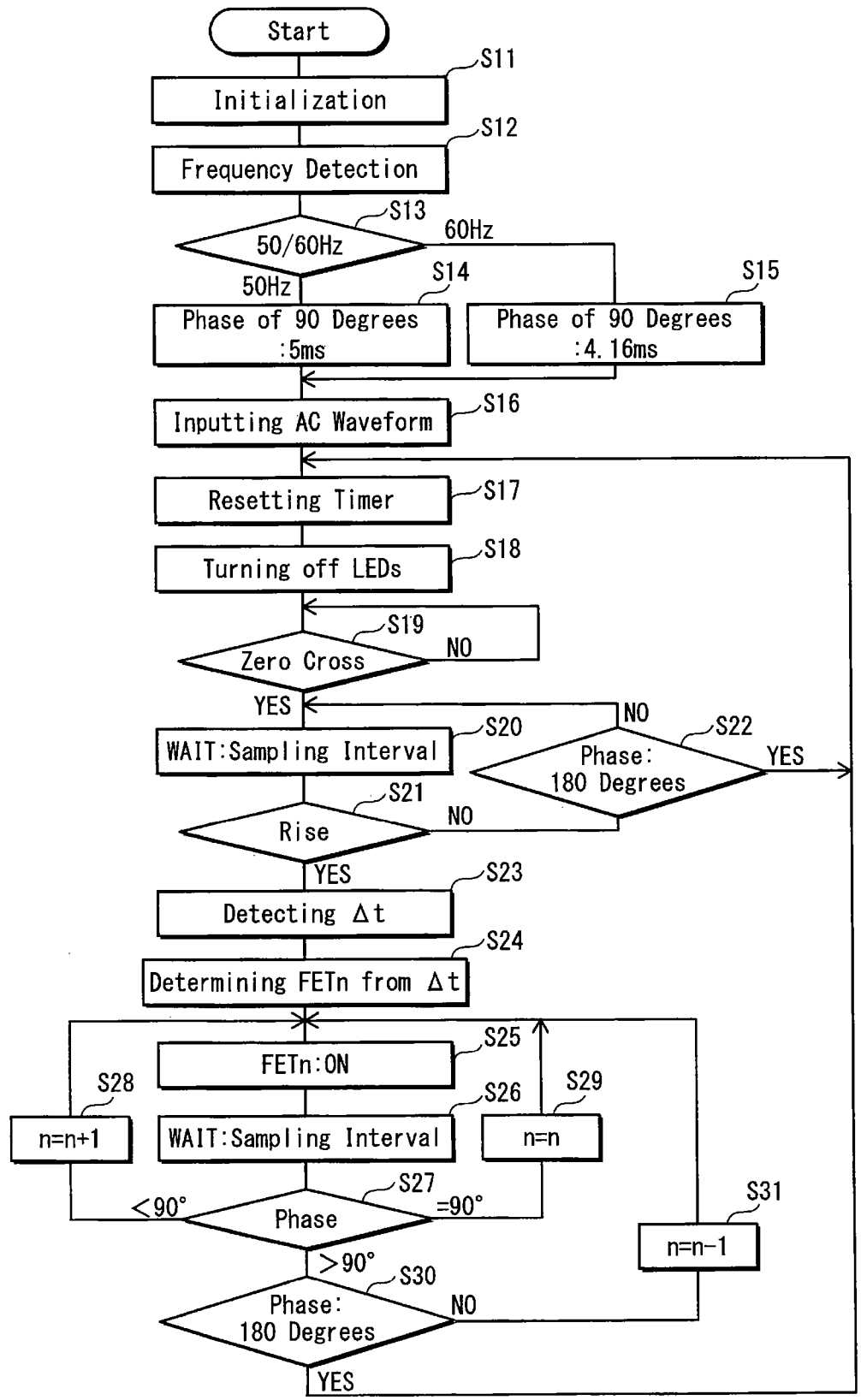
FIG. 11 is a flow chart showing the operations of the micro computer.
Figure 12:
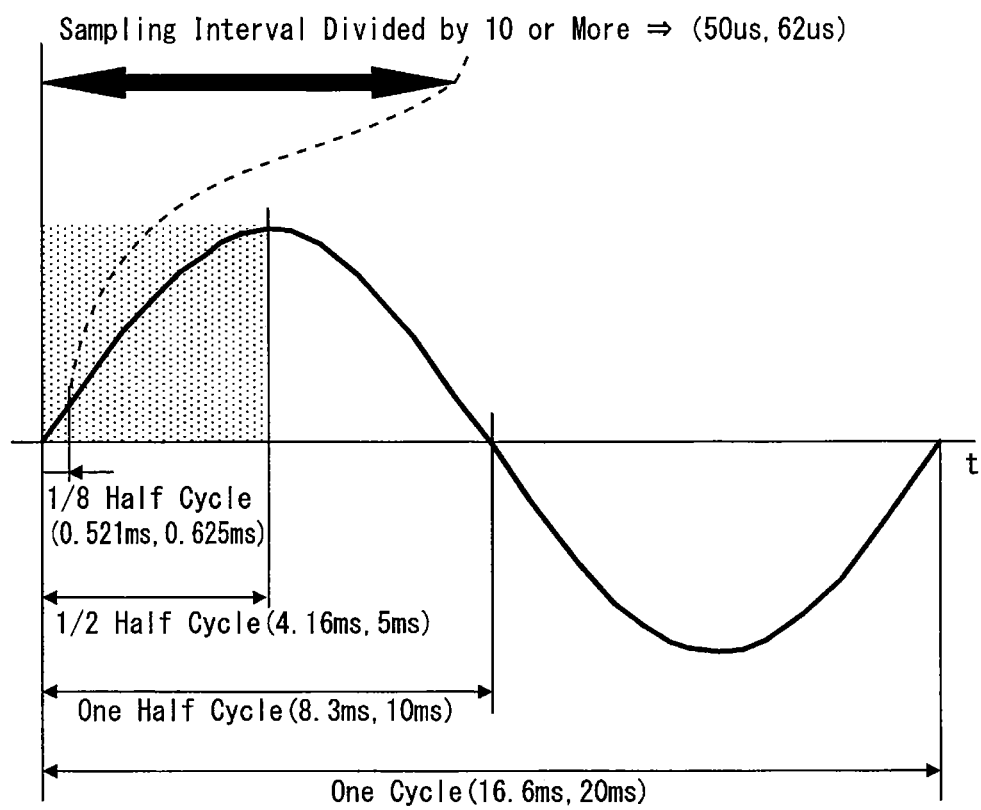
FIG. 12 is a view showing the relationship between the cycle of the AC power source and the sampling interval of the voltage.

FIG. 11 is a flow chart showing the operations of the micro computer. FIG. 12 is a view showing the relationship between the cycle of the AC power source and the sampling interval of the voltage.

First, when the lighting device 1 is powered up, 5V of DC voltage is input to the power supply terminal Vin of the micro computer 12. Subsequently, the micro computer 12 performs initialization (step S11).

Next, the micro computer 12 detects the frequency of the AC power source (step S12), samples the AC waveform immediately after the power-up, and calculates the frequency automatically. If the frequency is 50 Hz (step S13: 50 Hz), the micro computer 12 associates the phase of 90 degrees with 5 ms (step S14). If the frequency is 60 Hz (step S13: 60 Hz), the micro computer 12 associates the phase of 90 degrees with 4.16 ms (step S15).

Next, the micro computer 12 receives input from the analog input terminal Ain (step S16), resets the timer 122 (step S17), and turns off all the FETs 1 to 8 so as to turn the LEDs off (step S18).

Next, the micro computer 12 attempts to detect the zero cross of the voltage of the AC power source (step S19). If the zero cross is detected (step S19: YES), the micro computer 12 waits for a fixed sampling interval (step S20), and then judges whether or not the voltage of the AC power source has risen (step S21). If the voltage has not risen (step S21: NO), the micro computer 12 repeats the step of waiting for the sampling interval (step S20) and the step of judging the rise of the voltage (step S21) unless the phase has reached 180 degrees (step S22: NO). If the phase reaches 180 degrees before the rise of the voltage is detected, the micro computer 12 returns the process to step S17.

Under the phase control using the TRIAC 15, the timing of the rise of the voltage varies in accordance with the dimming level setting. The timing of the rise of the voltage can be detected in the above step of judging. Incidentally, as shown in FIG. 12, the sampling interval is obtained by dividing one section by 10 or more. In the present embodiment, since a half-cycle is divided into 16 sections, one section has a length of 0.521 ms at the frequency of 60 Hz and 0.625 ms at the frequency of 50 Hz. Accordingly, the sampling interval may be 50 μs at 60 Hz and 62 μs at 50 Hz, for example. The "rise of the voltage" includes both the changes of voltage from 0V to plus and from 0V to minus.

Detecting the rise of the voltage of the AC power source (step S21: YES), the micro computer 12 reads the time information out of the timer so as to detect the elapsed time Δt from the detection of the zero cross to the detection of the rise of the voltage (step S23).

Next, the micro computer 12 determines the phase corresponding to the detected elapsed time Δt, and also determines the FETn (n is an integer from 1 to 8) to be turned on with reference to the table shown in FIG. 10 (step S24). Subsequently, the micro computer 12 turns on the determined FETn (step S25). In determining the phase from the elapsed time Δt, the micro computer 12 uses the results obtained in the steps S13 to S15.

Next, the micro computer 12 waits for a period corresponding to the nth section with keeping the determined FETn turned on (step S26), and then judges whether the phase is less than, equal or more than 90 degrees (step S27). When the phase is less than 90 degrees, the micro computer 12 increments the number n (step S28) and returns the process to the step S25. When the phase is equal to 90 degrees, the micro computer 12 maintains the number n (step S29) and returns the process to the step S25. When the phase is more than 90 degrees, unless the phase does not exceed 180 degrees (step S30: NO), the micro computer 12 decrements the number n (step S31) and returns the process to the step S25. By the repetition of the above steps, in the sections from 0 to 90 degrees, the number of the LEDs connected in series increases as the phase increases, in the sections from 90 degrees to 180 degrees, the number of the LEDs connected in series decreases as the phase increases.

If the phase reaches 180 degrees (step S30: YES), the micro computer 12 returns the process to the step S17. In this way, similar operations are repeated every half-cycle.

In the present embodiment, the number of the LEDs inserted in series into the power supply path changes in accordance with the elapsed time from the zero cross of the AC voltage. Since the waveform and effective value of the AC voltage are already known, the elapsed time from the zero cross corresponds to the instantaneous value of the AC voltage. Accordingly, it can be said that, also in the present embodiment, the number of the LEDs inserted in series into the power supply path changes in accordance with the AC voltage.

Incidentally, in the second embodiment, if the reference voltage (effective value) of the AC power source decreases within the range of the tolerance, the LED set 8 is kept unlit continuously, and this may cause luminance unevenness. However, in the present embodiment, such luminance unevenness does not occur since the number of the LEDs turned on changes in accordance with the elapsed time from the zero cross.

The lighting device according to the present invention is described above with reference to embodiments thereof, but naturally the present invention is not limited to these embodiments. For example, the variants below are envisaged.

Figure 13:
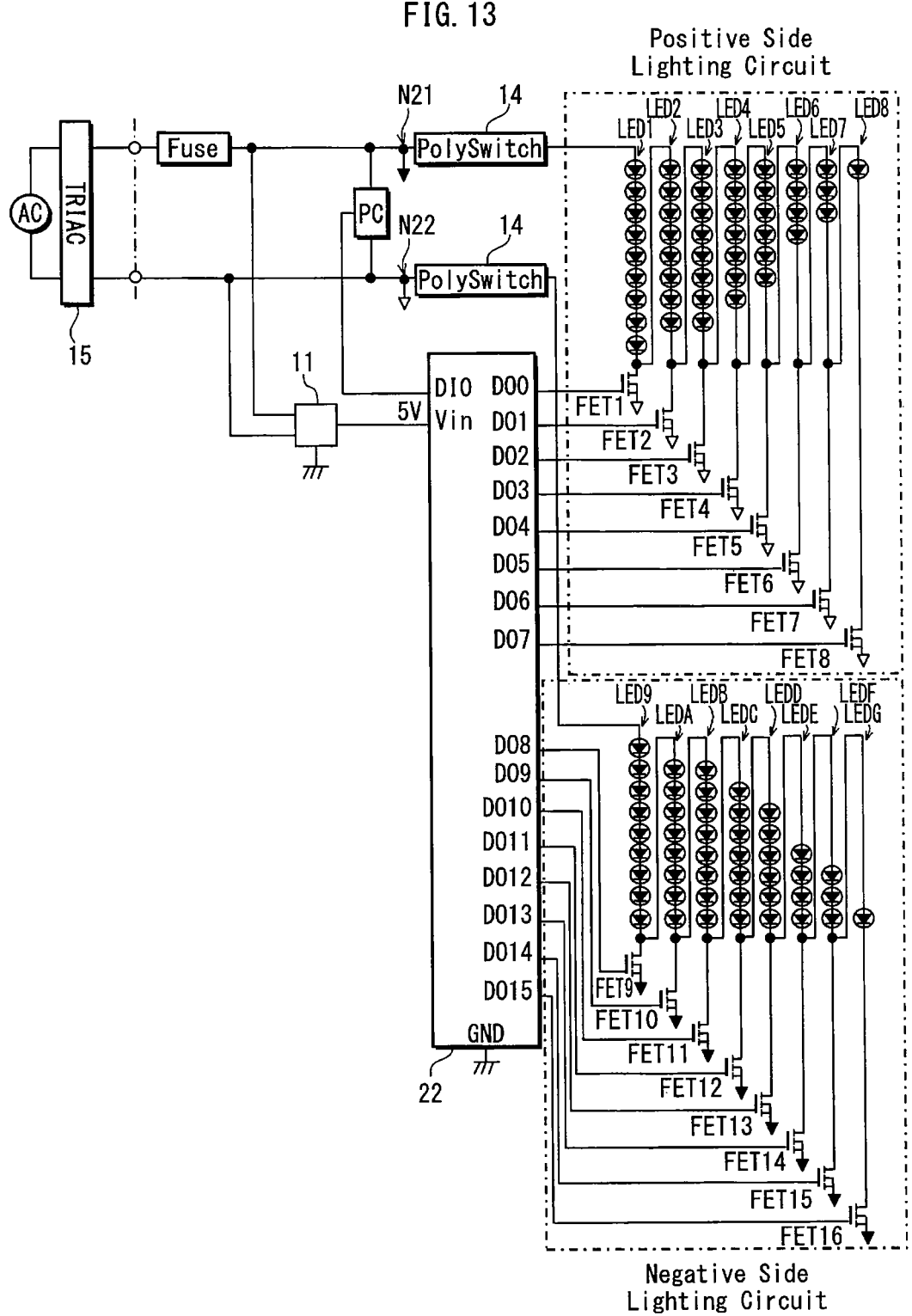
FIG. 13 is a circuit diagram showing a variation of the arrangement of LEDs.

(1) In the second and third embodiments, the diode bridge DB performs full-wave rectification of the AC voltage, and the voltage after the full-wave rectification is supplied to the LED array. However, the present invention is not limited to this structure. For example, as shown in FIG. 13, the diode bridge DB may be omitted. In this case, a positive and negative AC voltage is supplied to the LED array without rectification. In the positive side lighting circuit (including LED sets 1 to 8), each of the FETs 1 to 8 has its source terminal connected to the node N22. On the other hand, in the negative side lighting circuit (including LED sets 9 to G), each of the FETs 9 to 16 has its source terminal connected to the node N21. In other words, the positive side lighting circuit and the negative side lighting circuit are connected to the AC power source in anti-parallel. When the voltage of the AC power source is in the positive half-cycle, the micro computer 22 selectively turns on one of the FETs 1 to 8, and turns off all of the FETs 9 to 16. On the other hand, when the voltage of the AC power source is in the negative half-cycle, the micro computer 22 selectively turns on one of the FETs 9 to 16, and turns off all of the FETs 1 to 8.

According to such structure, since half of the LEDs are unlit during each half-cycle, thermal stress can be reduced. In addition, since the diode bridge DB is omitted, the number of parts can be reduced. Consequently, the size is further reduced and the service life increases.

(2) In the embodiments, the total number of LEDs is calculated as 46 from the peak value (155V) of the AC voltage, with the tolerance of the AC voltage taken into consideration. However, the treatment of the tolerance is dependent on the design concept of the designer. The total number of LEDs does not necessarily have to be calculated from the value (155V). For example, the total number of LEDs may be calculated as 42 from the peak value (141V) of the AC voltage. In this case, when the AC voltage increases within the range of the tolerance, a large portion of the excess voltage is turned into heat. However, a heat dissipation design with a sufficient margin could ensure the rating life of the LEDs.

Alternatively, it can be envisaged that the LEDs are used for a period shorter than their rating life to an extent.

Figure 14:
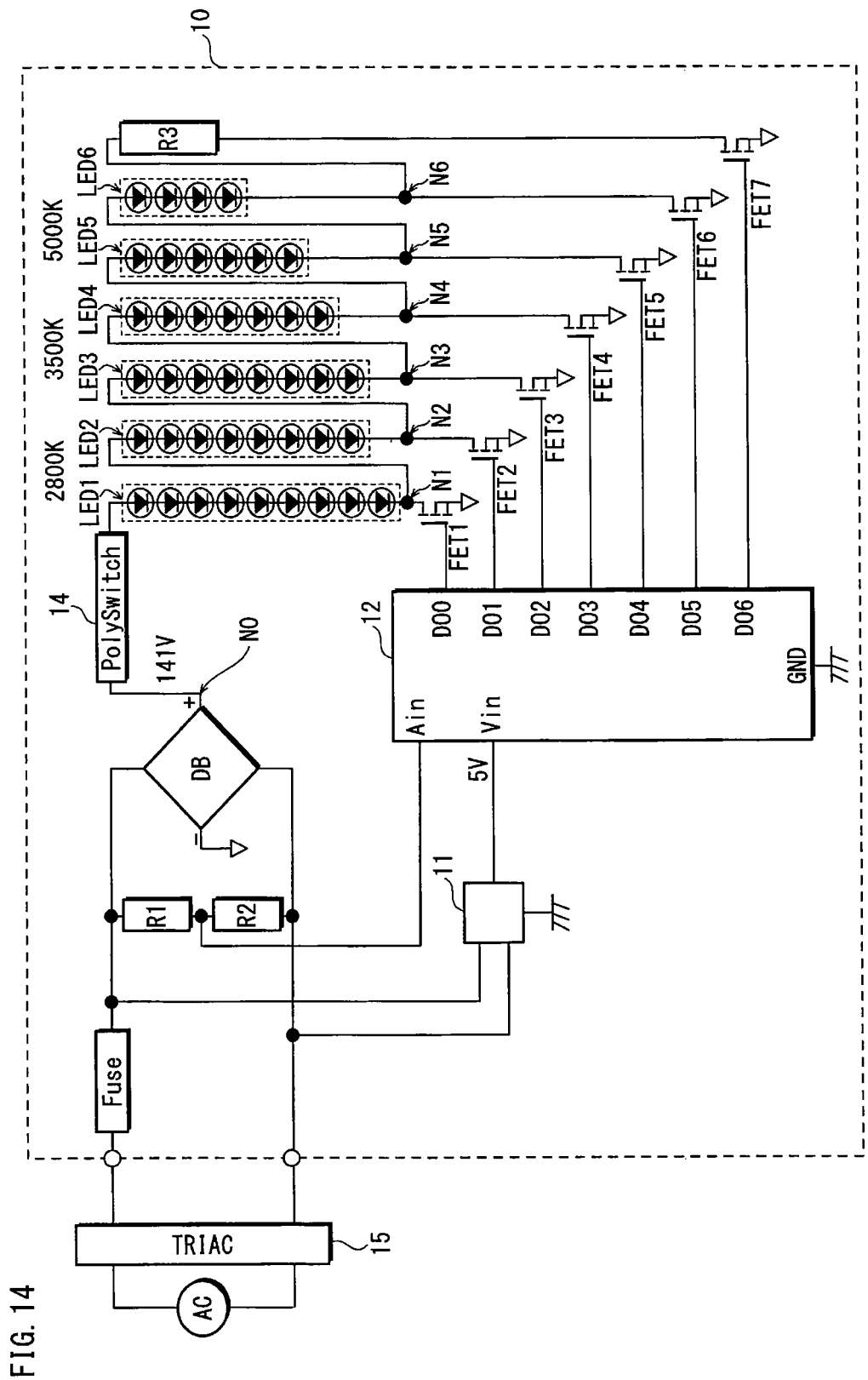
FIG. 14 is a circuit diagram showing another variation of the arrangement of LEDs.

In addition, as shown in FIG. 14, a resistor R3 may be provided for the purpose of over voltage protection. In the configuration shown in FIG. 14, when the instantaneous value of the AC voltage reaches or exceeds 144V, the FET 7 is turned on and current is allowed to flow to the resistor R3. Consequently, excess voltage is prevented from being applied to the LEDs.

(3) FIG. 15 shows arrangements of LEDs in the light-emitting module. In FIG. 15, each lighting color is represented by a respective different pattern. In FIGS. 15A and 15D, LEDs of the same lighting color are disposed in a same single region. In FIGS. 15B, 15C, 15E and 15F, LEDs of the same lighting color are disposed separately in a plurality of regions. Such disposition enables an effective color mixture of different lighting colors. Also, in FIGS. 15B, 15C, 15E and 15F, LEDs are disposed in a manner that LED sets grouped by lighting color have the same centroid. This disposition enables color unevenness in an irradiation surface to be suppressed. Furthermore, in the lighting using an AC current, the LED set 8 which lights up last may be disposed near the center. This disposition is effective since a lamp-shaped lighting device generates better texture when the center portion thereof lights up last, and since, with the use of a secondary optical system, luminous unevenness is suppressed when irradiation is performed by a reflection plate, etc.

Figure 15A:
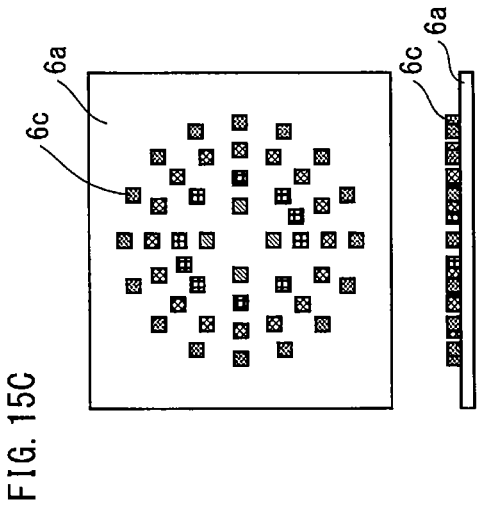
FIG. 15 is a view showing examples of the disposition of the LEDs in a light-emitting module.
Figure 15B:
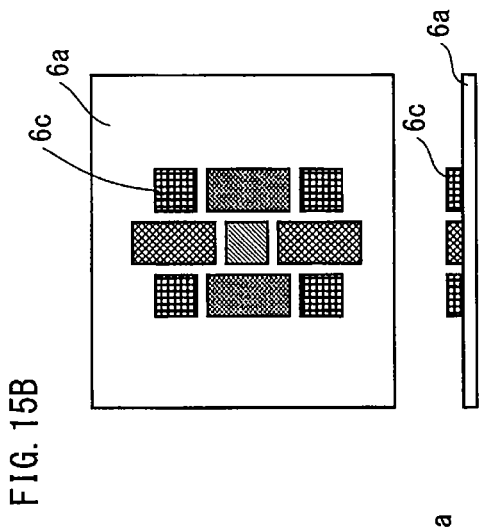
Figure 15C:
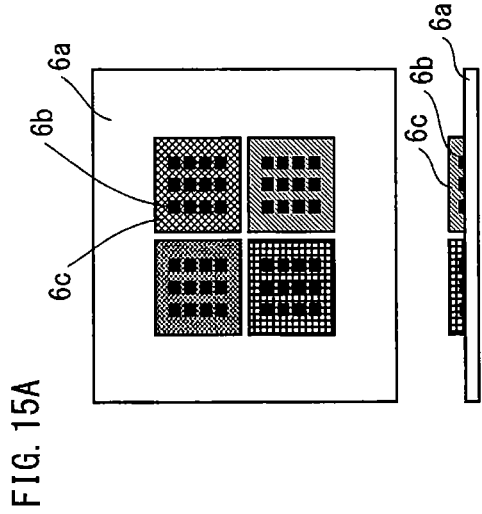
Figure 15D:
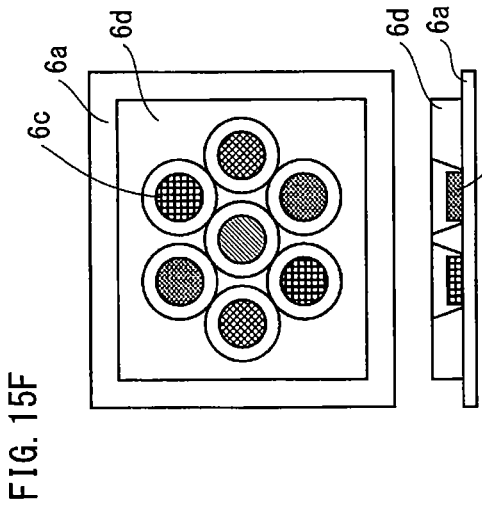
Figure 15E:
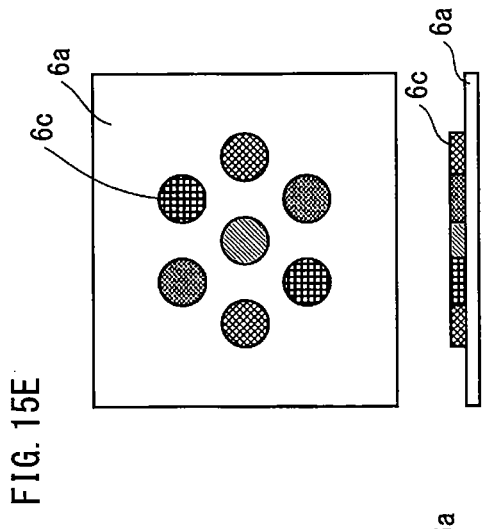
Figure 15F:
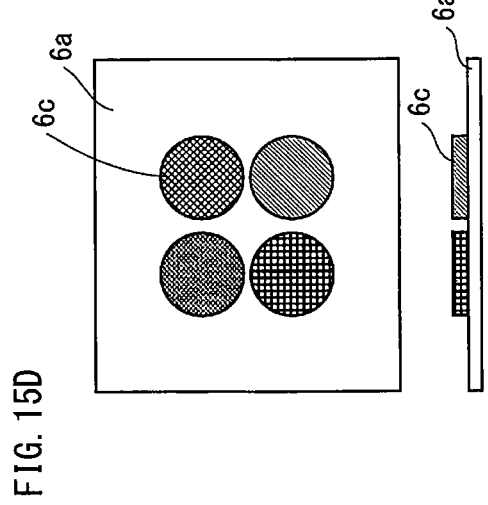

In addition, as shown in FIG. 15F, a reflecting plate 6d may be provided, which enables an efficient use of light.

(4) The applicable methods for changing a lighting color of an LED are as follows.

A. Changing the types of the fluorescent materials contained in the molded resin part 6c.

B. Changing the optical path length through the molded resin part 6c.

C. Changing the concentration of the fluorescent materials contained in the molded resin part 6c.

D. Changing the lighting colors itself of the LEDs.

Figure 16A:
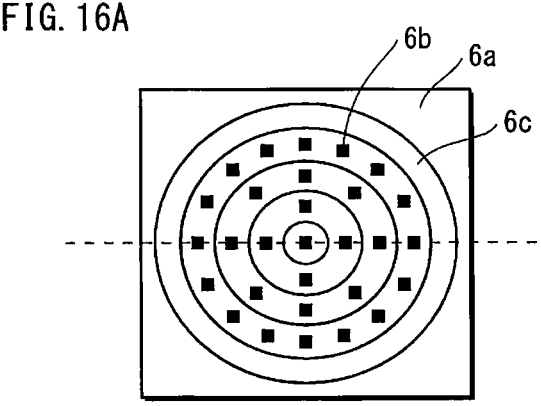
FIG. 16 is a view showing a variation of the light-emitting module.
Figure 16B:
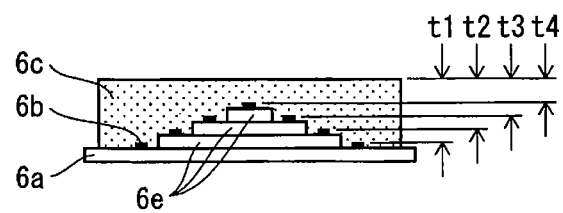
Figure 16C:
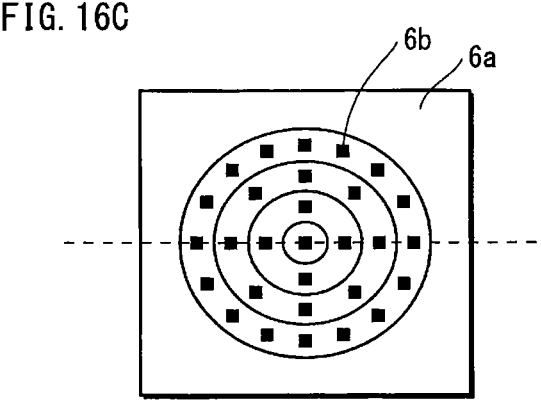
Figure 16D:
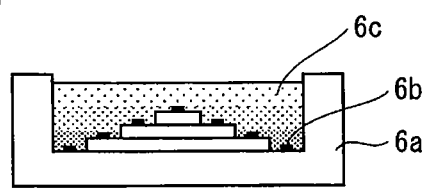

In the case of the above method A, for example, red color fluorescent materials, orange color fluorescent materials, green color fluorescent materials or blue color fluorescent materials can be appropriately selected to be used. FIG. 16A shows the example to which the above method B is applied. In this example, sub-mounts 6e are used to change the distance from the top surface of the molded resin part 6c to the LEDs in four steps. Consequently, even when a single type of fluorescent material is used, the color temperatures of the lighting colors of the LEDs can be made different. FIG. 16B shows the example to which the above method C is applied. In this example, the color temperatures of the lighting colors of the LEDs can be made different due to the gradation, in the thickness direction, of the concentration of the fluorescent material dispersed in the molded resin part 6c. In the case of the above method D, for example, a red color LED, green color LED and blue color LED, etc. may be available.

(5) Photopic vision of human eyes is highly sensitive to the light having a wavelength of 555 nm, and, their scotopic vision is highly sensitive to the light having a wavelength of 507 nm. In other words, the luminosity function in photopic vision reaches its peak at a shorter wavelength than that of the luminosity function in scotopic vision. Therefore, in order to provide a lighting device which enables clear vision even in a dark environment, such a specification can be envisaged that the color temperature of lighting color of the LED array increases as the dimming level decreases. In order to achieve such specification, for example, the color temperatures of the LED sets are designed so as to decrease in order from the LED set 1 to the LED set 8 as shown below.

LED set 1: 6700 K
LED set 2: 6700 K
LED set 3: 5000 K
LED set 4: 5000 K
LED set 5: 3500 K
LED set 6: 3500 K
LED set 7: 2800 K
LED set 8: 2800 K (6) In the above embodiments, four types of lighting colors are used. However, when at least two types of lighting colors are used, the present invention achieves an advantage.

(7) In the above embodiments, LEDs are inserted into the power supply path in the unit of sets. However, the present invention is not limited to this. For example, LEDs may be inserted into the power supply path one by one.

(8) In the above embodiments, the exemplified lighting device has an outer shape modeled on an incandescent lamp. However, the present invention is not limited to this. In addition, though the TRIAC is provided outside the lighting device in the above embodiments, the TRIAC may be provided inside the lighting device.

(9) In the third embodiment, the rise from the zero cross point of the voltage is detected with reference to the change of the voltage at the analog input terminal of the micro computer. However, the detection may be performed using a digital input terminal with reference to a threshold voltage. In this case, since no analog input terminal is required for the micro computer, a low-priced micro computer can be used.

(10) In the second and third embodiments, the voltage divider resistors R1 and R2 are disposed at the AC power source side relative to the diode bridge DB for detecting the AC voltage. However, the present invention is not limited to this. For example, the voltage divider resistors R1 and R2 may be disposed at the load side relative to the diode bridge DB for detecting the full-wave rectified AC voltage. In addition, in the above embodiments, the voltage is detected by detecting the ratio voltage used by the voltage divider resistors. However, the present invention is not limited to this. Differential detection by means of a Zener diode and photo coupler may be employed.

(11) In the third embodiment, operations are sequentially performed based on the operation flow. However, the present invention is not limited to this. In order to accelerate the performance, multi-task control by means of interruptions triggered by the detection of the zero cross may be employed. However, with respect to such zero cross interruptions, malfunctions may be caused by an irregular zero cross rarely generated due to abnormal signals, etc. The frequency information detected in the initial stage of the operation flow may be used so that the irregular zero cross may not be detected as a zero cross.

(12) In the above embodiments, the half wavelength (i.e., 0 to 90 degrees) of the AC voltage is divided nearly equally by 8. However, the division number is not necessarily 8, but may be 2 or more.

(13) In the third embodiment, as shown in FIG. 11, the sampling interval is obtained by dividing one lighting period by 10. However, the present invention is not limited to this. For example, in order to improve the accuracy of the timing of the on/off of lighting, the division number may be increased to such as 100 or 1000.

Figure 17:
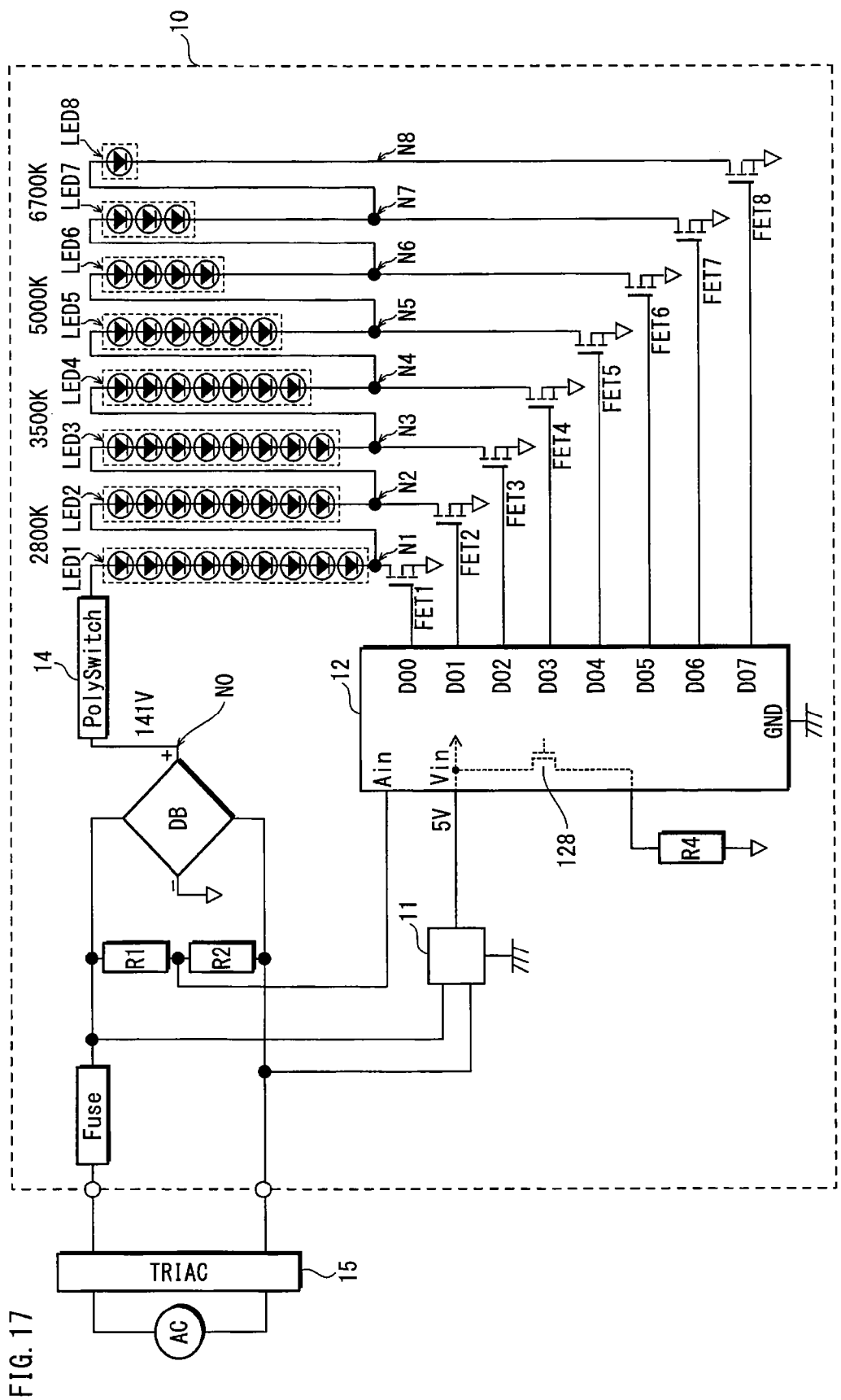
FIG. 17 is a circuit diagram showing still another variation of the arrangement of LEDs.

(14) The TRIAC 15 operates in a stable manner when a load is connected on the secondary side. While LEDs are lighting up, since the LEDs serve as the load, the TRIAC 15 can operate in a stable manner. On the other hand, while the LEDs are unlit, since none of the LED sets 1 to 8 serve as the load, the operation of the TRIAC 15 is liable to be unstable. Accordingly, in order that the TRIAC 15 may operate in a stable manner while the LEDs are unlit, resistors, light-emitting elements or diodes may be inserted, in series or in parallel, in the secondary side of the TRIAC 15 so that a load current of several dozens of mA flows. FIG. 17 is a circuit diagram showing still another variation of the arrangement of LEDs. Here, the load (resistor R4) is connected to the secondary side of the TRIAC via an internal circuit of the micro computer 12. Incidentally, in the example shown in FIG. 17, the load (resistor R4) is connected via the switch element 128 included in the micro computer 12. However, in case of an always-on connection, the switch element 128 is not required.

The load such as the resistor, light-emitting element and diode may be on an always-on connection. Alternatively, the load may be connected only in a period from the zero cross to the detection of the rise of the voltage in a half-cycle of the AC voltage (i.e., in a period while the LEDs are unlit). Consequently, power consumption is reduced. In the example shown in FIG. 17, this can be achieved by the micro computer 12 which keeps the load (resistor R4) turned on from the zero cross to the detection of the rise of the voltage in a half-cycle of the AC voltage, and keeps the load (resistor R4) turned off from the detection of the rise of the voltage to the next zero cross. Turning on/off is achieved by the on/off control of the switch element 128 included in the micro computer 12.

Incidentally, in the case where the setting of the dimming level is near the minimum, even when LEDs light up, sufficient load current may not flow for the TRIAC to operate in a stable manner. Therefore, the connection of the load may be switched so that, if the maximum number of the LEDs inserted in series into the power supply path is equal to or exceeds a predetermined number in a half-cycle of the AC voltage, the load is connected only while the LED are unlit, and, if the maximum number is less then the predetermined number, the load is always connected. For example, in the case where the voltage rises in the first half of a half-cycle (i.e., while the phase angle is in the range of 0 to 90 degrees), all the LEDs included in the LED array light up at the phase angle of 90 degrees. In this case, the maximum number of the LEDs lighting up in the half-cycle is equal to the total number of the LEDs included in the LED array. On the other hand, in the case where the voltage rises in the last half of the half-cycle (while the phase angle is in the range of 91 to 180 degrees), the maximum number of the LEDs lighting up in the half-cycle is dependent on the phase angle when the voltage rises. Detecting the rise of the voltage, the micro computer 12 can determine the maximum number of the LEDs lighting up in the half-cycle based on the phase angle at the detection of the rise. Accordingly, the control can be performed so that, if the maximum number is equal or exceeds the predetermined number, the load will be connected while LEDs are lighting up in the next half-cycle, and so that, if the maximum number is less than the predetermined number, the load will be always connected in the next half-cycle.

The load may be connected to any position as long as the position is in the secondary side of the TRIAC. It does not matter whether in the primary side of the diode bridge (AC side), or in the secondary side of the diode bridge (pulsating current side).

(15) In the above embodiments, the molded resin parts 6*c* containing wavelength conversion materials are used as the wavelength conversion parts. However, the present invention is not limited to this. For example, glass parts or ceramic parts containing wavelength conversion materials may be used as the wavelength conversion parts.

Figure 18:
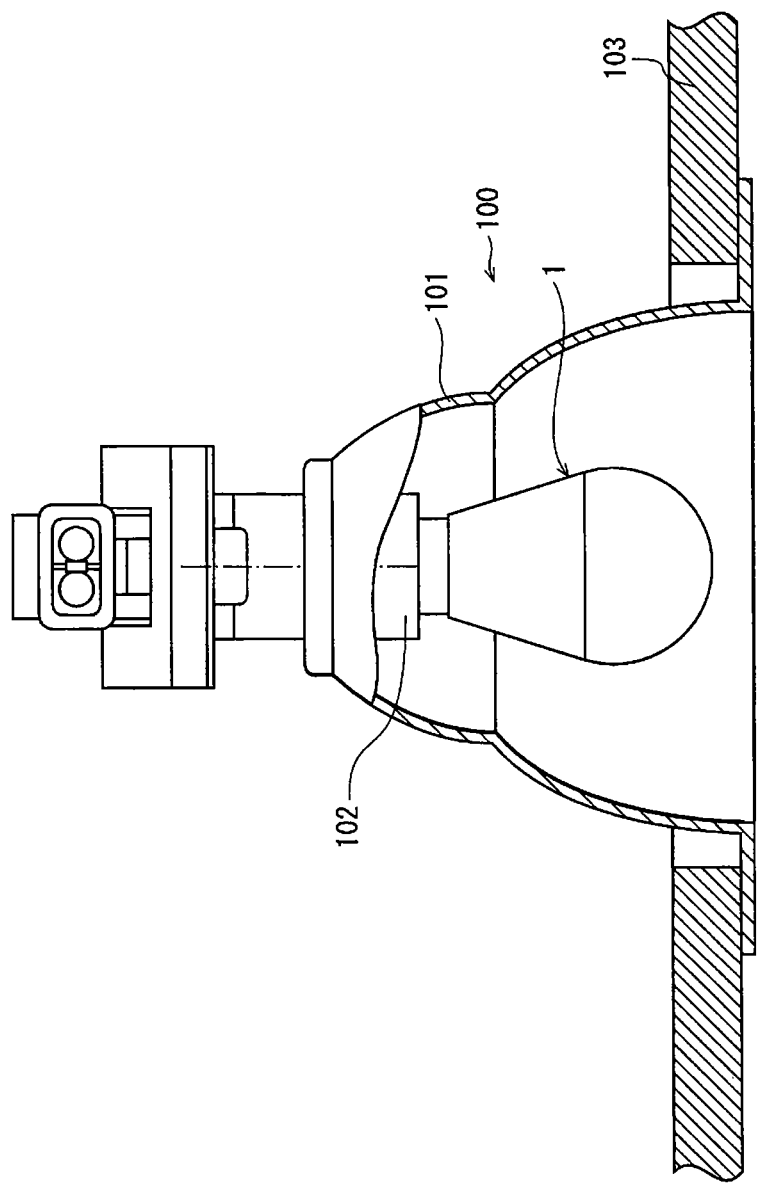
FIG. 18 shows the structure of a lighting system.

(16) The lighting device according to the above embodiments can be combined with a lighting fixture to which the lighting device is attached so as to be used as a lighting system. FIG. 18 shows the structure of the lighting system. The lighting system includes the lighting device 1 and a lighting fixture 100. The lighting fixture 100 is mounted on a mounting surface 103 such as a ceiling, and includes a cup-shaped reflecting mirror 101 and a socket 102. The lighting device 1 is attached to the lighting fixture 100 by having the base thereof screwed with the socket 102.

INDUSTRIAL APPLICABILITY

The present invention can be used for general lighting.

REFERENCE SIGNS LIST

1 Lighting device
2 Case
3 Base
4 Circuit module
5 Heat sink
6 Light-emitting module
6*a* Substrate
6*b* LED chip
6*c* Molded resin part
6*d* Reflecting plate
6*e* Sub-mount
7 Globe
10 Lighting circuit
11 DC power source unit
12, 22 Micro computer
14 PolySwitch
15 TRIAC
100 Lighting fixture
101 Reflecting mirror
102 Socket
103 Mounting surface
121 Analog-digital converter
122 Timer
123 CPU
124 ROM
125 RAM
126 Input port
127 Output port
128 Switch element

The invention claimed is:

1. A lighting device to which phase controlled AC electric power is supplied, the lighting device comprising:
a rectifying/smoothing circuit that rectifies and soothes the AC electric power;
a light-emitting array including a plurality of light-emitting elements that are grouped into two or more sets, each set having one of different lighting colors, the sets being inserted in series to a wiring having two ends in an order of the color temperatures of the lighting colors, one end of the wiring being connected to a positive terminal of the rectifying/smoothing circuit, a plurality of nodes positioned between each pair of sets inserted between the one end and the other end of the wiring, each node being connected, via a respective switch element, to a negative terminal of the rectifying/smoothing circuit; and
a switching unit that turns on one of the switch elements in accordance with a voltage level of the phase controlled AC electric power wherein as the voltage is higher, the one of the switch elements that is turned on is on a more distant node from the one end of the wirings.

2. A lighting device to which phase controlled AC electric power is supplied, the lighting device comprising:
a rectifying circuit that rectifies the AC electric power;
a light-emitting array including a plurality of light-emitting elements that are grouped into two or more sets, each set having one of different lighting colors, the sets being inserted in series to a wiring having two ends in an order of the color temperatures of the lighting colors, one end of the wiring being connected to a positive terminal of the rectifying circuit, a plurality of nodes positioned between each pair of sets inserted between the one end and the other end of the wiring, each node being connected, via a respective switch element, to a negative terminal of the rectifying circuit; and
a switching unit that turns on one of the switch elements in accordance with the voltage level of the phase controlled AC electric power wherein as the voltage level is higher, the one of the switch elements that is turned on is on a more distant node from the one end of the wirings.

3. The lighting device of claim 2, wherein the equation below is satisfied, $$N = Veff \times 1.1 \times \sqrt{2} / Vf$$

wherein N indicates a total number of the plurality of light-emitting elements, Veff(V) indicates an effective value of the voltage of the AC power 10 source and Vf(V) indicates a voltage induced when a rated current flows in a single light-emitting element.

4. The lighting device of claim 1, wherein
each of the plurality of light-emitting elements includes a light-emitting chip and a wavelength converting part containing a wavelength converting material for converting the wavelength of light emitted from the light-emitting chip, the plurality of light-emitting elements emitting light of different lighting colors by means of different types of the wavelength converting materials.

5. The lighting device of claim 1, wherein
each of the plurality of light-emitting elements includes a light-emitting chip and a wavelength converting part containing a wavelength converting material for converting the wavelength of the light emitted from the light-emitting chip, the plurality of light-emitting elements emitting light of different lighting colors by means of different optical path length of the light passing through the wavelength converting parts.

6. The lighting device of claim 1, wherein
the plurality of light-emitting elements include light-emitting chips each having a different lighting color.

7. The lighting device of claim 2, further comprising a load being connected in parallel with the light-emitting array.

8. The lighting device of claim 2, further comprising:
a series circuit composed of a load and a switching element connected to the load in series, and being connected in parallel with the light-emitting array; and
a control unit configured to cause electric current to turn on the switching element during a period from zero cross to detection of rise of the voltage, and to turn off the switching element during a period from detection of the rise of the voltage to next zero cross, during a half-cycle of the AC voltage of the AC electric power.

9. The lighting device of claim 2, further comprising:
a series circuit composed of a load and a switching element connected to the load in series, and being connected in parallel with the light-emitting array; and
a control unit configured to, when the maximum number of the LEDs inserted in series into the power supply path is equal to or exceeds a predetermined value, turn on the switching element while the LEDs are unlit during a half-cycle of the AC voltage of the AC electric power, and turn off the switching element when the maximum number of the LEDs is less than the predetermined value, during the entire half-cycle.

10. The lighting system comprising the lighting device of claim 1 and a lighting fixture to which the lighting device is attached.

11. The lighting device of claim 2, wherein
each of the plurality of light-emitting elements includes a light-emitting chip and a wavelength converting part containing a wavelength converting material for converting the wavelength of light emitted from the light-emitting chip, the plurality of light-emitting elements emitting light of different lighting colors by means of different types of the wavelength converting materials.

12. The lighting device of claim 2, wherein
each of the plurality of light-emitting elements includes a light-emitting chip and a wavelength converting part containing a wavelength converting material for converting the wavelength of the light emitted from the light-emitting chip, the plurality of light-emitting elements emitting light of different lighting colors by means of different optical path length of the light passing through the wavelength converting parts.

13. The lighting device of claim 2, wherein
the plurality of light-emitting elements include light-emitting chips each having a different lighting color.

* * * * *